// United States Patent [15] 3,657,076
Bernstein [45] Apr. 18, 1972

[54] METHOD OF BONDING QUARTZ TO METAL

[72] Inventor: Marvin Bernstein, Asbury Park, N.J.

[73] Assignee: The United States of America as represented by the Secretary of the Army

[22] Filed: Dec. 17, 1970

[21] Appl. No.: 99,288

[52] U.S. Cl. ..............................204/16, 29/472.9, 29/473.1, 204/20

[51] Int. Cl. ....................C23b 7/00, C23b 5/60, B23k 31/02

[58] Field of Search ............204/16, 20, 15; 29/472.9, 473.1

[56] References Cited

UNITED STATES PATENTS

| | | | |
|---|---|---|---|
| 2,338,538 | 1/1944 | Pulfrich et al. | 204/16 |
| 3,417,459 | 12/1968 | Pomerantz et al. | 204/16 |

OTHER PUBLICATIONS

Quartz Crystal Plating by H. G. Wehe Bell Laboratories Record Vol. 23, No. 12 Dec. 1945 pgs. 475–479

*Primary Examiner*—T. Tung
*Assistant Examiner*—T. Tufariello
*Attorney*—Harry M. Saragovitz, Edward J. Kelly, Herbert Berl and Roy E. Gordon

[57] ABSTRACT

A quartz surface is bonded to a metallic surface such as stainless steel. The method involves the sequential vacuum evaporation of chromium, copper and chromium, and copper onto the quartz surface to form in superposition, a chromium film, a copper-chromium film, and a copper film in that order on the quartz surface. The quartz surface bearing these superimposed films is then placed in electrical and physical contact with the stainless steel surface to which it is to be bonded and immersed in an electroplating solution of an electroplatable metal. An electrode composed of said electroplatable metal is also immersed in the electroplating solution. The exposed stainless steel surface is then electrically connected to the negative terminal of a suitable power supply, and the electrode of said electroplatable metal electrically connected to the positive terminal of the power supply. A variable current limiting resistor and milliammeter are series connected to the terminals of the power supply and a suitable plating current is then passed through the solution.

5 Claims, No Drawings

METHOD OF BONDING QUARTZ TO METAL

This invention relates in general to the art of bonding a quartz surface to a metallic surface, and in particular to a method of bonding a quartz surface to a stainless steel surface.

BACKGROUND OF THE INVENTION

The availability of an adherent metallic bond between a quartz surface and a metallic surface such as stainless steel is important in certain applications such as in a quartz crystal unit where one bonds a quartz resonator to a stainless steel support. The conventional method, using conductive cements, depends upon the proper condition of the cement as well as the correct amount of silver flake for adequate adherence and conductivity. Too little flake results in good bonds that are lossy or even nonconductive. Excess flake results in good conductivity but poor adherence.

SUMMARY OF THE INVENTION

The general object of this invention is to provide a method of forming a metallic bond between a quartz surface and a metallic surface such as a stainless steel surface. A more particular object of this invention is to provide a method of forming a metallic bond between a quartz resonator and a stainless steel support therefore.

According to the invention, a metallic bond is formed between a quartz surface and a stainless steel surface by an electroplating method. The method includes plating a thin layer of a low stress electrically conductive metal such as nickel, gold or copper, onto a composite chromium-copper (Cr-Cu) film which is strongly adherent to quartz. Since the chromium itself cannot be electroplated because of a layer of oxide which forms on its surface, near the end of the chromium evaporation cycle, copper is evaporated simultaneously with the chromium. Finally, only copper is evaporated to form a pure copper top layer. Mixing of copper and chromium during the evaporation cycle causes the copper to be strongly attached to the chromium. Then, the quartz coated surface is placed in physical and electrical contact with the stainless steel surface, and the low stress electrically conductive metal plated from a suitable plating solution onto both the quartz coated surface and the stainless steel surface.

DETAILED DESCRIPTION OF THE PREFERRED EMBODIMENT

In this embodiment, a quartz resonator is bonded to a stainless steel ribbon support in a crystal unit using nickel as the electroplating material. The first step involves the vacuum evaporation of chromium to form chromium spots on both sides of a quartz crystal blank. Then, chromium and copper are vacuum evaporated simultaneously to form a thin layer or film composed of copper and chromium on the chromium spots. Then, copper alone is vacuum evaporated on this film to form a pure copper top layer over the combined chromium-copper layer. All the aforementioned vacuum evaporation steps can be conveniently carried out in any suitable high vacuum apparatus using a chrome plated tungsten filament and a tungsten boat filament containing pure copper as the source materials. The above vacuum evaporation steps are conveniently carried out at pressures about $10^{-4}$ Torr. The coated quartz crystal blank is then inserted in physical and electrical contact with stainless steel ribbon supports and the parts of the blank which are coated and are to be bonded immersed in an aqueous nickel electroplating solution containing 60 ounces per gallon of nickel sulfamate and 4 ounces per gallon of boric acid. A nickel electrode is also immersed in the solution. The stainless steel supports are then electrically connected by means of pin leads to the negative terminal of a battery, and the nickel electrode immersed in the solution and connected to the positive terminal of the battery. A variable resistor and milliammeter are connected in the battery circuit to provide a plating current of approximately 1.5 milliamperes for 90 minutes. This results in the deposition of approximately 0.0005 inch of nickel; the resulting bond having a pull strength of at least 6 pounds at this film thickness.

EXAMPLE 2.

The method is similar to the above except that a copper electrode and an aqueous copper electroplating solution is used; the copper electroplating solution containing 5 to 6 ounces of copper sulfate per gallon and 1 ounce of sulfuric acid per gallon. A plating current of 20 milliamperes per crystal unit is established for 20 to 60 minutes resulting in a film thickness substantial enough to survive the usual shock tests given quartz crystal units.

In the method generally, the thickness of the various films that are vacuum evaporated and the thickness of the film electroplated are generally dependent upon the particular application of the quartz-metal bond.

In lieu of the chromium-copper composites shown in the examples, other chromium containing composites may be used of metals that can be electroplated such as silver, gold, etc. Similarly, metal surfaces that can be electroplated can be used in lieu of the stainless steel.

We wish it to be understood that we do not desire to be limited to the exact details of construction shown and described, for obvious modifications will occur to a person skilled in the art.

What is claimed is:

1. Method of forming a metallic bond between a quartz surface and a stainless steel surface, said method including the steps of:
   A. vacuum evaporating chromium onto said quartz surface to form a chromium film,
   B. simultaneously vacuum evaporating chromium and copper onto said quartz surface to form a chromium-copper film over said chromium film,
   C. vacuum evaporating copper over said quartz surface to form a copper film over said chromium-copper film,
   D. placing said quartz surface coated with said films in physical and electrical contact with said stainless steel surface,
   E. immersing said surfaces to be bonded into an electroplating solution of an electroplatable metal, an electrode composed of said electroplatable metal also being immersed in said electroplating solution, and
   F. passing a plating current through said solution.
2. Method according to claim 1 wherein the electroplatable metal is selected from the group consisting of nickel, copper, and gold.
3. Method according to claim 1 wherein the quartz surface is a quartz resonator blank, and the electroplating solution is an aqueous nickel solution.
4. Method according to claim 1 wherein the quartz surface is a quartz resonator blank and the electroplating solution is an aqueous copper solution.
5. Method according to claim 1 wherein the quartz surface is a quartz blank and the electroplating solution is an aqueous gold solution.

* * * * *